United States Patent
Sutcliffe et al.

(10) Patent No.: US 8,871,001 B2
(45) Date of Patent: *Oct. 28, 2014

(54) METHOD FOR LEACHING ZINC FROM A ZINC ORE

(75) Inventors: Matthew Leslie Sutcliffe, London (GB); Garry Mervyn Johnston, Claremont (AU); Nicholas James Welham, Ballarat (AU)

(73) Assignee: Metaleach Limited, Tortola (VG)

( * ) Notice: Subject to any disclaimer, the term of this patent is extended or adjusted under 35 U.S.C. 154(b) by 376 days.

This patent is subject to a terminal disclaimer.

(21) Appl. No.: 13/258,058

(22) PCT Filed: Feb. 19, 2010

(86) PCT No.: PCT/AU2010/000187
§ 371 (c)(1),
(2), (4) Date: Oct. 1, 2012

(87) PCT Pub. No.: WO2010/108212
PCT Pub. Date: Sep. 30, 2010

(65) Prior Publication Data
US 2013/0025412 A1    Jan. 31, 2013

(30) Foreign Application Priority Data
Mar. 24, 2009   (AU) ............................... 2009901246

(51) Int. Cl.
C22B 19/20   (2006.01)
C22B 3/14    (2006.01)
C22B 3/00    (2006.01)
C22B 1/02    (2006.01)
C22B 19/02   (2006.01)
C22B 3/26    (2006.01)

(52) U.S. Cl.
CPC ... *C22B 1/02* (2013.01); *C22B 3/14* (2013.01); *C22B 19/24* (2013.01); *C22B 19/26* (2013.01); *C22B 19/22* (2013.01); *C22B 19/02* (2013.01); *C22B 3/0005* (2013.01)
USPC .............................................. 75/420; 75/431

(58) Field of Classification Search
USPC ........................ 75/720, 431, 420; 423/99, 109
See application file for complete search history.

(56) References Cited

U.S. PATENT DOCUMENTS 1,943,331 A * 1/1934 Mitchell ........................ 423/109
2,107,255 A * 2/1938 McComb ......................... 423/23

(Continued)

FOREIGN PATENT DOCUMENTS

AU    2008/906664    12/2008
CN      1341760 A      3/2002

OTHER PUBLICATIONS

Alkac, Dilek. "Modification of Magnetic Properties of Siderite by Thermal Treatment." Thesis.. Middle East Technical University, 2007. <Alkac, Dilek. Modification of Magnetic Properties of Siderite by Thermal Treatment. N.p., Sep. 2007. Web. Nov. 22, 2013. >.*

(Continued)

*Primary Examiner* — George Wyszomierski
*Assistant Examiner* — Tima M McGuthry Banks
(74) *Attorney, Agent, or Firm* — Harness, Dickey & Pierce, P.L.C.

(57) ABSTRACT

A method for leaching zinc from a zinc-bearing carbonate ore, the method comprising the steps of: subjecting the zinc-bearing carbonate ore to elevated temperatures of between about 300° C. and about 900° C. thereby producing a roasted ore; subjecting the roasted ore to an aqueous acid or alkali leach thereby producing an aqueous zinc solution; and subjecting the aqueous zinc solution to a zinc recovery step.

15 Claims, 5 Drawing Sheets

(56) References Cited

U.S. PATENT DOCUMENTS

| | | | |
|---|---|---|---|
| 2,603,554 A | | 7/1952 | Calbeck |
| 2,695,843 A | * | 11/1954 | Schaufelberger et al. ...... 75/373 |
| 2,848,314 A | * | 8/1958 | Johannsen et al. .............. 423/49 |
| 2,874,041 A | * | 2/1959 | Radino .......................... 423/101 |
| 5,028,410 A | | 7/1991 | Spink et al. |
| 8,323,596 B2 | * | 12/2012 | Johnston et al. .............. 423/100 |

OTHER PUBLICATIONS

Magnesia from Magnesite by Calcination/Carbon Dioxide Leaching: Influence of Calcination Conditions; Canterford, J.H., Everson, P.T., Moyle, F.J., 1981, AusIMM Bulletin 277, pp. 45-52.

Dissolution kinetics of dehydroxylated nickeliferous goethite from limonitic lateritic nickel ore; Landers, M., Gilkes, R.J., Wells, M., 2009, Applied Clay Science 42(3-4), pp. 615-624.

The Hydrometallurgical Extraction of Zinc by Ammonium Carbonate: A Review of the Schnabel Process; Harvey, T.G., 2006, Mineral Processing & Extractive Metallurgy Review 27(4), pp. 231-279.

Leaching of Oxidized Zinc Ores in Various Media; Frenay, J., 1985, Hydrometallurgy 15(2), pp. 243-253.

International Search Report and Written Opinion for PCT/AU2010/000187, mailed Mar. 21, 2010; ISA/AU.

* cited by examiner

AAC - 40g/L ammonium carbonate + 20g/L NH$_3$
SAC - 80g/L ammonium carbonate + 70g/L NH$_3$

FIGURE 9

METHOD FOR LEACHING ZINC FROM A ZINC ORE

CROSS-REFERENCE TO RELATED APPLICATIONS

This application is a 371 U.S. National Stage of International Application No. PCT/AU2010/000187, filed on Feb. 19, 2010, and claims priority to Australian patent application No. 2009901246, filed with the Australian Patent Office on Mar. 24, 2009, the contents of which are herein incorporated by reference in their entirety.

FIELD OF THE INVENTION

The present invention relates to a method for leaching zinc from a zinc ore. More particularly, the present invention relates to a method for leaching zinc from a zinc-bearing carbonate ore.

BACKGROUND ART

Sulphide deposits have dominated production of primary zinc. Current estimates are that approximately 95% of the zinc mined worldwide is mined from sulfidic ore deposits, in which the ore is typically mixed with sulfides of copper, lead and/or iron. After grinding the ore, froth flotation is used to separate minerals from the gangue, taking advantage of differences in their hydrophobicity. (The concentrate is either smelted or undergoes roasting (to produce zinc oxide and sulfur dioxide), acid leaching (typically using at least some of the sulfur dioxide to produce acid) then electrowinning to recover zinc.

Unlike sulfides, zinc oxide is not readily separated from gangue materials by gravimetric means. Accordingly, the zinc oxide component of a mixed zinc oxide-zinc sulfide ore is typically discarded. However, increasing zinc demand has resulted in increased interest in recovering zinc from non-sulfide zinc ores, such as oxides and carbonate ores.

As far as the inventors are aware, the only commercial hydrometallurgical process for the production of zinc from zinc oxides is Skorpion Zinc, in Namibia. However, Skorpion has a minimum reported headgrade of 11% Zinc. Ores where the zinc oxide content is lower, or where there is a mixture of sulphide and oxide components, cannot presently be economically processed.

Carbonate based zinc ores are significant ore resources in terms of volume but cannot presently be processed. Zinc may be present in carbonate ores as either a pure zinc carbonate (the mineral smithsonite) or as a constituent of another mineral, such as iron carbonate (the mineral siderite, which may contain up to half the iron replaced by zinc). Pure zinc carbonate is uncommon and typically does not form economic deposits unless other zinc-bearing minerals are also present. There are a number of zinc-bearing siderite deposits known but these are generally regarded as untreatable due to the uneconomically high consumption of reagents necessary to achieve acceptable zinc dissolution.

The method of leaching of the present invention has as one object thereof to overcome the abovementioned problems associated with the prior art, or to at least provide a useful alternative thereto.

The preceding discussion of the background art is intended to facilitate an understanding of the present invention only. The discussion is not an acknowledgment or admission that any of the material referred to is or was part of the common general knowledge as at the priority date of the application.

DISCLOSURE OF THE INVENTION

Throughout this specification, unless the context requires otherwise, the word "comprise", or variations such as "comprises" or "comprising", will be understood to imply the inclusion of a stated integer or group of integers but not the exclusion of any other integer or group of integers.

Throughout this specification, unless the context requires otherwise, the term "ore" or variations thereof, will be understood to include, for example, the product of one or more concentration steps, but is not limited thereto.

Throughout this specification, unless the context requires otherwise, a reference to the composition of a mixture of ores by way of percentage should be understood to be a reference to percentage by weight.

Other definitions for selected terms used herein may be found within the description of the invention and apply throughout. Unless otherwise defined, all other scientific and technical terms used herein have the same meaning as commonly understood.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

The present invention is not to be understood to be limited in scope by the specific embodiments described herein, which are intended for the purpose of exemplification only. Functionally equivalent products, compositions and methods are clearly within the scope of the invention as described.

The invention described herein may include one or more ranges of values. A range of values will be understood to include all values within the range, including the values defining the range, and values adjacent to the range which lead to the same or substantially the same outcome as the values immediately adjacent to that value which defines the boundary to the range.

In accordance with the present invention, there is provided a method for leaching zinc from a zinc-bearing carbonate ore, the method comprising the steps of:
(i) subjecting the zinc-bearing carbonate ore to elevated temperatures of between about 300° C. and about 900° C. thereby producing a roasted ore;
(ii) subjecting the roasted ore to an aqueous acid or alkali leach thereby producing an aqueous zinc solution; and
(iii) subjecting the aqueous zinc solution to a zinc recovery step.

The inventors have discovered that heat treatment of carbonate containing ores renders such significantly more amenable to acid or alkali leaching.

Furthermore, the inventors have discovered that the temperatures required to render the ore more amenable to leaching are economically viable.

The zinc-bearing carbonate ore may form part of a mixture with other ores, including other zinc bearing ores. For example, the zinc-bearing carbonate ore may be mixed with a zinc oxide ore or a zinc sulfide ore. Where the zinc-bearing carbonate ore forms part of a mixture with other ores, the zinc-bearing carbonate ore preferably forms at least 0.5% of the mixture. Preferably still, the zinc-bearing carbonate ore preferably forms at least 1% of the mixture. Preferably still, the zinc-bearing carbonate ore preferably forms at least 2% of the mixture. Preferably still, the zinc-bearing carbonate ore preferably forms at least 3% of the mixture. Preferably still, the zinc-bearing carbonate ore preferably forms at least 4% of the mixture. Preferably still, the zinc-bearing carbonate ore preferably forms at least 5% of the mixture. Preferably still, the zinc-bearing carbonate ore preferably forms at least 10% of the mixture. Preferably still, the zinc-bearing carbonate ore preferably forms at least 15% of the mixture. Preferably still, the zinc-bearing carbonate ore preferably forms at least 20% of the mixture. Preferably still, the zinc-bearing carbonate ore preferably forms at least 25% of the mixture. Preferably still, the zinc-bearing carbonate ore preferably forms at least 30% of the mixture. Preferably still, the zinc-bearing carbonate ore preferably forms at least 35% of the mixture. Preferably still, the zinc-bearing carbonate ore preferably forms at least 40% of the mixture. Preferably still, the zinc-bearing carbonate ore preferably forms at least 45% of the mixture. Preferably still, the zinc-bearing carbonate ore preferably forms at least 50% of the mixture. Preferably still, the zinc-bearing carbonate ore preferably forms at least 55% of the mixture. Preferably still, the zinc-bearing carbonate ore preferably forms at least 60% of the mixture. Preferably still, the zinc-bearing carbonate ore preferably forms at least 65% of the mixture. Preferably still, the zinc-bearing carbonate ore preferably forms at least 70% of the mixture. Preferably still, the zinc-bearing carbonate ore preferably forms at least 75% of the mixture.

Preferably still, the zinc-bearing carbonate ore preferably forms at least 80% of the mixture. Preferably still, the zinc-bearing carbonate ore preferably forms at least 85% of the mixture. Preferably still, the zinc-bearing carbonate ore preferably forms at least 90% of the mixture. Preferably still, the zinc-bearing carbonate ore preferably forms at least 95% of the mixture.

Without wishing to be bound by theory, it is believed that the elevated temperatures of the method of the invention effects decomposition of the carbonate ion present in the ore to generate carbon dioxide. This decomposition necessarily effects a phase change from carbonate to oxide, by the general equation below:

$$MCO_3 = MO + CO_2$$

Where M is any divalent element, or combination thereof, which form a carbonate, including, but not limited to, Fe, Zn, Ca, Mg and Mn. Where the divalent element also has a higher oxidation stage an oxidation may occur either simultaneously or sequentially. Using iron as an example, the reactions become $$FeCO_3 = FeO + CO_2$$

$$6FeO + O_2 = 2Fe_3O_4$$

$$4FeO + O_2 = 2Fe_2O_3$$

if the reaction is sequential, and $$6FeCO_3 + O_2 = 2Fe_3O_4 + 6CO_2$$

$$4FeCO_3 + O_2 = 2Fe_2O_3 + 4CO_2$$

if the reaction is simultaneous.

Where there are mixed divalent element carbonates present the heating will result in separation of those metals into different phases with different leaching behaviour. Using an iron-zinc carbonate with a six to one molar ratio of iron to zinc as an example, the reaction becomes:

$$6FeCO_3 \cdot ZnCO_3 = 6FeO + ZnO + 7CO_2$$

The atomic level intermixing of the iron and zinc atoms within the crystallographic structure does not permit the selective decomposition of one component and not the other as would be the case with a physical mixture of $FeCO_3$ and $ZnCO_3$.

As for the example using iron above, if one element can be further oxidised then higher valence oxides may form either simultaneously or sequentially.

$$6FeCO_3 \cdot ZnCO_3 + O_2 = 2Fe_3O_4 + ZnO + 7CO_2$$

$$6FeCO_3 \cdot ZnCO_3 + \tfrac{3}{2}O_2 = 3Fe_2O_3 + ZnO + 7CO_2$$

Whether oxidation is required to effect the separation is not presently known.

At higher temperatures, the phases present can further react to form more complex compounds. In the conventional roast-leach-electrowin process for sulphide concentrates the ore is roasted at around 800-900° C. The zinc sulphide mineral in the feed contains up to 10% of iron as a replacement for the zinc in the crystallographic lattice, this composition can be summarised in a chemical formula as $Zn_{0.9}Fe_{0.1}S$. During roasting the majority of the zinc forms ZnO but a fraction forms compounds with iron, including $ZnFe_2O_4$ which is not readily leachable.

$$Zn_{0.9}Fe_{0.1}S + O_2 = 0.85ZnO + 0.05ZnFe_2O_4 + SO_2$$

For typical zinc bearing iron carbonate ores the iron is present in the majority. Under this circumstance, the reaction to form $ZnFe_2O_4$ will be complete for zinc but incomplete for iron. Using the iron-zinc carbonate with a six to one molar ratio of iron to zinc as an example, the overall reaction at higher temperature becomes:

$$6FeCO_3 \cdot ZnCO_3 + \tfrac{3}{2}O_2 = 2Fe_2O_3 ZnFe_2O_4 + 7CO_2$$

which renders the zinc unleachable except in strong acids.

Thus, the operating temperature needs to be above that necessary for decomposition of the carbonate phase but below that where reaction between the separated phases occurs.

In accordance with the present invention, there is provided a method for leaching zinc from a zinc-bearing carbonate ore, the method comprising the steps of:
(i) subjecting the zinc-bearing carbonate ore to elevated temperatures of between about 300° C. and about 900° C. thereby producing a roasted ore enriched in zinc oxide relative to the zinc-bearing carbonate ore;
(ii) subjecting the roasted ore to an aqueous acid or alkali leach thereby producing an aqueous zinc solution; and
(iii) subjecting the aqueous zinc solution to a zinc recovery step.

In accordance with the present invention, there is provided a method for leaching zinc from a zinc-bearing carbonate ore, the method comprising the steps of:
(i) subjecting the zinc-bearing carbonate ore to elevated temperatures of between about 300° C. and about 900° C. thereby producing a roasted ore enriched in zinc oxide and depleted in carbonate relative to the zinc-bearing carbonate ore;
(ii) subjecting the roasted ore to an aqueous acid or alkali leach thereby producing an aqueous zinc solution; and
(iii) subjecting the aqueous zinc solution to a zinc recovery step.

The inventors are aware of the oxidative roasting of sphalerite (ZnS) to form ZnO, which takes place at temperatures of between 800° C. and 900° C., as part of the common roast-leach-electrowin process for zinc. As would be understood by a person skilled in the art, the chemical change effected by this process, zinc sulfide to zinc oxide with liberation of $SO_2$, differs to that which the inventors believe underlies the present invention.

As explained in the discussion of the background art, zinc may be present in carbonate ores as either a pure zinc carbonate (the mineral smithsonite) or as a minor constituent of another mineral, such as iron carbonate (the mineral siderite, which may contain up to half the iron replaced by zinc). Accordingly, throughout this specification, unless the context requires otherwise, reference to an ore/mineral that in a pure form does not contain zinc should to be understood to be a reference to such the ore/mineral in which at least a portion of the non-zinc metal is substituted with zinc.

In a preferred form of the invention, the ratio of zinc to other metal in the zinc-bearing carbonate ore is at least 10. In a preferred form of the invention, the ratio of zinc to other metal in the zinc-bearing carbonate ore is at least 5. In a preferred form of the invention, the ratio of zinc to other metal in the zinc-bearing carbonate ore is at least 2. In a preferred form of the invention, the ratio of zinc to other metal in the zinc-bearing carbonate ore is at least 1. In a preferred form of the invention, the ratio of zinc to other metal in the zinc-bearing carbonate ore is at least 0.5. In a preferred form of the invention, the ratio of zinc to other metal in the zinc-bearing carbonate ore is at least 0.2. In a preferred form of the invention, the ratio of zinc to other metal in the zinc-bearing carbonate ore is at least 0.1. In a preferred form of the invention, the ratio of zinc to other metal in the zinc-bearing carbonate ore is at least 0.05. In a preferred form of the invention, the ratio of zinc to other metal in the zinc-bearing carbonate ore is at least 0.02. In a preferred form of the invention, the ratio of zinc to other metal in the zinc-bearing carbonate ore is at least 0.01.

The zinc-bearing carbonate ore may be selected from the group: smithsonite ($ZnCO_3$), siderite ($FeCO_3$), rhodochrosite ($MnCO_3$), calcite ($CaCO_3$), magnesite ($MgCO_3$), minrecordite ($CaZn(CO_3)_2$), dolomite ($CaMg(CO_3)_2$) and solid solution intermixtures thereof.

Preferably, the zinc-bearing carbonate ore is selected from the group: smithsonite ($ZnCO_3$), siderite ($FeCO_3$), calcite ($CaCO_3$), dolomite ($CaMg(CO_3)_2$) and solid solution intermixtures thereof.

Preferably still, the zinc-bearing carbonate ore is siderite. In a specific form of the invention, the zinc-bearing carbonate ore is zincian siderite $(Fe,Zn)CO_3$ where Fe>Zn.

In a preferred form of the invention, the elevated temperature is between about 400° C. and about 800° C.

In a preferred form of the invention, the elevated temperature is between 400° C. and 800° C.

In a preferred form of the invention, the elevated temperature is between about 500° C. and about 700° C.

In a preferred form of the invention, the elevated temperature is between 500° C. and 700° C.

In one form of the invention, the zinc-bearing carbonate is subjected to an elevated temperature for a period of between about 5 minutes and about four hours. It will be recognised by a person skilled in the art that a higher temperature will necessitate a shorter residence time than lower temperature. Larger feed ore particles will also necessitate a longer residence time than finer particles. For each ore there will be an optimum time at any particular temperature.

The zinc recovery step may recover the zinc as zinc metal or as a zinc compound. Zinc recovery steps appropriate for the method of the present invention will be known to those of skill in the art, and may include one or more of electrowinning, steam stripping (resulting in precipitation), precipitation by pH adjustment, and spray drying. The zinc recovery step may also comprise a solvent extraction and or electrolysis step. It will be understood by those skilled in the art that the choice of recovery method is based on the relative economic benefits. The choice is further defined by the concentration of zinc in the purified solution.

In a highly preferred form of the invention, where the step of subjecting the roasted ore to an aqueous acid or alkali leach thereby producing an aqueous zinc solution more specifically comprises subjecting the roasted ore to an ammoniacal leach, after the step of subjecting the roasted ore to an ammoniacal leach and before the step of subjecting the aqueous zinc solution to a zinc recovery step, the method comprises the steps of:

(i) contacting the aqueous ammoniacal zinc solution containing impurities with an organic phase comprising an ammonium salt of an organic acid extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;

(ii) separating the zinc-enriched, ammonium-depleted organic phase from the ammonium-enriched, zinc-depleted aqueous phase containing impurities; and (iii) contacting the zinc-enriched, ammonium-depleted organic phase with an aqueous solution of ammonia, allowing transfer of the zinc from the organic phase and transfer of ammonium from the aqueous phase, thereby providing an aqueous ammoniacal zinc solution and an organic phase containing an ammonium salt of the organic extractant;

as described in the applicant's co-pending Australian provisional patent application 2008906664, "Method for Extracting Zinc from Aqueous Ammoniacal Solutions", the entire contents of which are incorporated by reference.

One embodiment of the method for leaching zinc from a zinc-bearing carbonate ore of the present invention will now be described with reference to FIG. 1, which is a flow diagram representing the method of the embodiment.

The description of the embodiment should not be understood to in any way limit the generality of the foregoing description.

BEST MODE(S) FOR CARRYING OUT THE INVENTION

Figure 1:
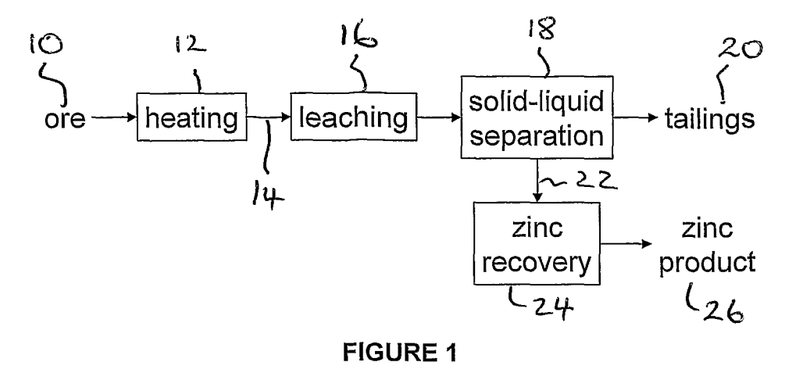
FIG. 1 represents the method for removing zinc according to the present teachings.

Referring to FIG. 1, a zinc-bearing carbonate ore in the form of zincian siderite 10 is fed into a heating device 12, such as a rotary kiln or fluidised bed. Prior to heating the zincian siderite 10 may be crushed to reduce particle size. The heating device 12 heats the zincian siderite to a temperature of between 400° C. and 800° C. for a period of approximately one hour, thereby effecting liberation of carbon dioxide, and production of a zinc oxide phase, producing a roasted ore 14 enriched in zinc oxide and depleted in carbonate relative to the zincian siderite 10. The roasted ore 14 is introduced into an aqueous ammoniacal leach 16 whilst still warm to give an above ambient leaching temperature. After a predetermined leaching time the solids and pregnant aqueous zinc solution are separated 18, possibly by thickening or filtration, and the zinc-depleted tailing 20 disposed of. The pregnant aqueous leach solution 22 is further purified by a solvent exchange process (not shown), in which the pregnant aqueous leach solution 22 is first contacted with an organic phase comprising an ammonium salt of an organic acid extractant dissolved in a hydrophobic diluent, as described in the applicant's co-pending Australian provisional patent application 2008906664, "Method for Extracting Zinc from Aqueous Ammoniacal Solutions", before being passed to a zinc recovery step 24, where the zinc is recovered from solution as either metal or as another product 26, such as oxide.

EXAMPLES

The invention will now be described with reference to a series of examples. The examples should not be understood as in any way limiting the generality of the preceding description of the invention.

In all examples, the ore used was analysed by semi-quantitative X-ray diffraction and found to have the following phase composition: 58 wt % zincian siderite ($FeCO_3$), 15 wt % pyrite ($FeS_2$), 12 wt % quartz ($SiO_2$), 8 wt % silicates, 4 wt % sphalerite (ZnS), the remainder (3 wt %) could not be conclusively identified. The peak for siderite was slightly shifted from pure siderite indicating that some of the iron had been substituted by another metal. Aqua regia digestion of this ore showed a zinc content of 5.5%, the majority of which was present in the siderite.

As would be understood by a person skilled in the art, the utility of the present invention is not confined to ores of the precise characteristics of that used in the experiments. Decomposition temperatures (Duval, Inorganic Thermogravimetric Analysis, $2^{nd}$ ed., Elsevier, 1963) for relevant carbonates include:

| | |
|---|---|
| smithsonite ($ZnCO_3$) | 310° C. |
| siderite ($FeCO_3$) | 425° C. |
| rhodochrosite ($MnCO_3$) | 520° C. |
| calcite ($CaCO_3$) | 675° C. |
| magnesite ($MgCO_3$) | 425° C. |
| dolomite ($CaMg(CO_3)_2$) | 600° C. |

Furthermore, on the reasonable assumption that the solid solutions decompose at temperatures between the end members the method of the invention is highly applicable to such solid solutions.

Example 1

Acid Consumption of Unroasted Zinc-Bearing Carbonate Ore

Figure 2:
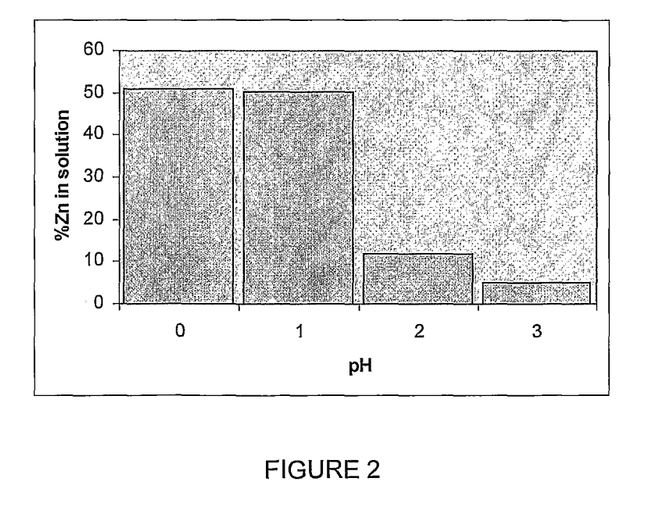
FIG. 2 is a graph showing the zinc recoveries from the zinc oxide ore samples of Example 1 that were leached for 24 hours in sulphuric acid at a different pH.

Samples of zinc oxide ore, as described above, that had not been treated according to the method of the present invention were leached for 24 h in sulphuric acid at different pH. The zinc recoveries are shown in FIG. 2. Clearly, the presence of a substantial carbonate component necessitates a low pH to be maintained for zinc recovery.

Figure 3:
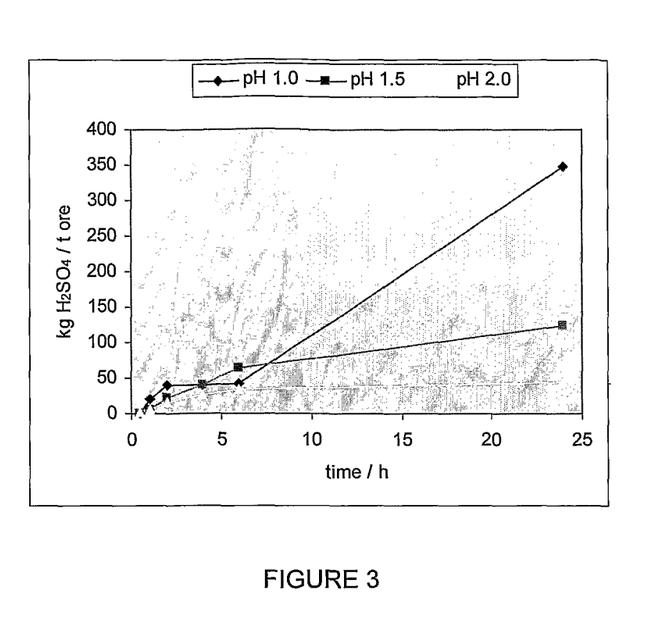
FIG. 3 is a graph showing the measured acid consumption of three of the samples that had been leached in Example 1.

A further run on a narrower pH range was made where the acid consumption was measured by titrating the solution to the starting pH several times during the run. FIG. 3 shows the acid consumption is extremely high and would be uneconomic for the recovery of zinc in all cases.

After the above run the solutions were analysed for zinc and the solids dried and weighed to determine mass loss. These data are shown in FIG. 4.

Figure 4:
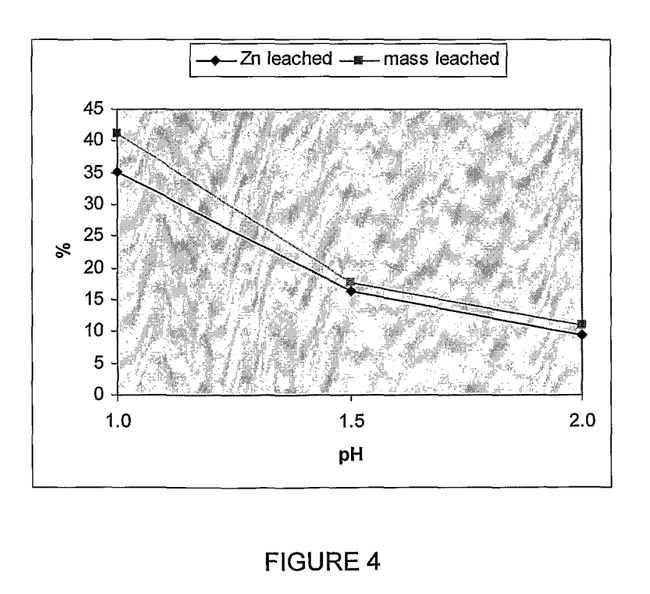
FIG. 4 shows the results of the zinc content and the mass loss of the samples of FIG. 3.

From FIG. 4, it is apparent that there is a very strong correlation between mass loss and zinc dissolved. This clearly indicates that to achieve high zinc recoveries from this ore a high extent of dissolution is required and to achieve this a low pH must be maintained through the addition of acid. Again, this is highly unlikely to be economic.

Example 2

Other Leaching Agents, Including Non-Acidic Agents

Figure 5:
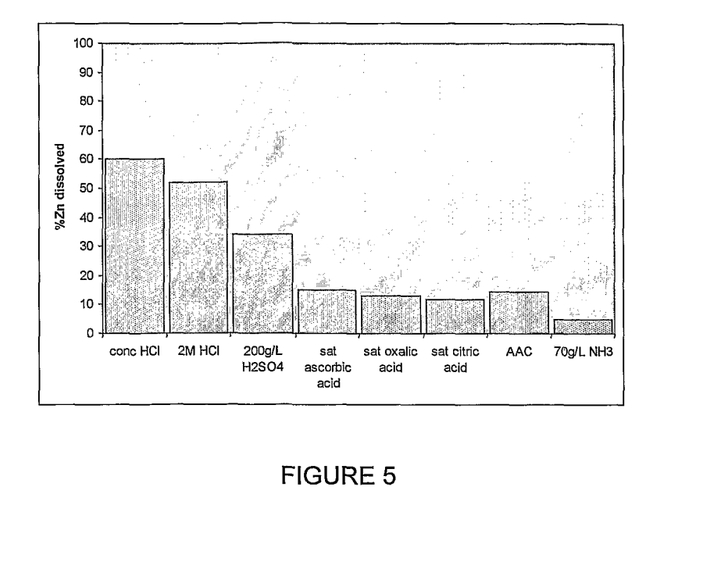
FIG. 5 is a graph showing the zinc recoveries from the zinc oxide ore samples of Example 2 that were leached for 24 hours in a range of different leaching agents.

Samples of zinc oxide ore that has not been treated according to the method of the present invention were subjected to a range of different leaching agents. All experiments were for 24 h at ambient temperature. FIG. 5 (note AAC—40 g/L ammonium carbonate+20 g/L $NH_3$) shows that the dissolution of zinc decreases as the pH of the leaching solution increases. However, the only leachant which provides a commercially viable extent of leaching is the concentrated hydrochloric which would be uneconomic to use.

Example 3

Effect of Heating the Zinc-Bearing Carbonate Ore Prior to Leaching

Figure 6:
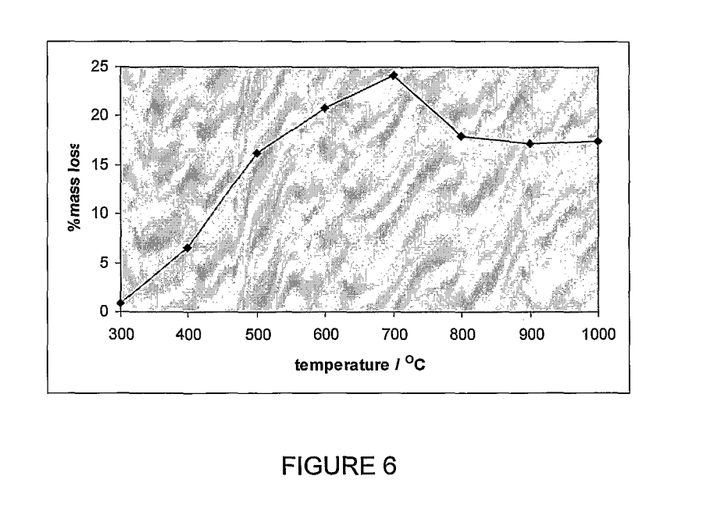
FIG. 6 is a graph of the mass loss in the sample of Example 3 as the temperature is increased.

Samples of a zinc-bearing carbonate ore were heated for 1 h at a range of temperatures. The mass loss as a function of temperature is shown in FIG. 6. As discussed above and without wishing to be bound by theory, the inventors believe that the mass loss is primarily due to the loss of carbon dioxide due to decomposition of the carbonate by the well known reaction.

$MCO_3 = MO + CO_2$

Where M is any combination of divalent metals (e.g. Fe, Zn, Mn, Co, Mg, Ca etc).

Figure 7:
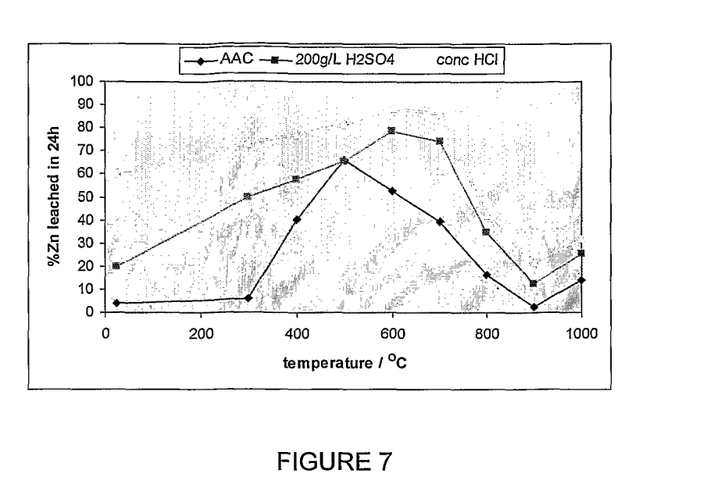
FIG. 7 is a graph showing the zinc recoveries of the roasted samples of Example 3 leached in a range of different leaching agents.

The roasted ores were leached in three different solutions with the results summarised in FIG. 7 (where MC—40 g/L ammonium carbonate+20 g/L $NH_3$). Data for the untreated zinc-bearing carbonate ore is also shown (at 25° C.).

The effect of heating the zinc-bearing carbonate ore is clear, with substantial increases in zinc dissolution for all three reagents. The most dramatic increase is for AAC, which increased from 4% in the untreated zinc-bearing carbonate ore to 66% after treatment at 500° C. The effect of heating on the acid leaching agents is lower, as expected from the earlier results which showed that only strong acids would leach the zinc from the untreated ore. The advantage of using AAC as the leaching agent is that iron is not soluble in this solution thereby obviating any necessity to remove it. The acids both lead to extensive dissolution of iron necessitating an iron separation step. Additionally, the data show that the extent of leaching of zinc is not simply related to the degree of mass loss during heating.

The leaching data summarised in FIG. 7 shows that there is an optimum temperature range for enhancement, and that this range is different for the acids and AAC leaching solutions. A further advantage of the AAC, in addition to at least substantially negating the need for an iron separation step, is that the temperature at which the maximum increase in leaching efficiency occurs is lower than that for the acids, thereby reducing energy costs, and improving process economics Without wishing to be bound by theory, it is thought that the carbonate decomposes at lower temperatures to form two phases, a soluble zinc phase (possibly ZnO) and an iron phase which is insoluble in AAC but partly or wholly soluble in the acids, necessitating an iron separation step. It is likely that the iron phase will be oxidised to some extent as the samples were heated in air. The presence of a phase change was indicated by the fact that the higher temperature samples were noticeably a different colour to those heated at a lower temperature. The decreased leaching performance at the highest temperatures appears to be related to the formation of unleachable phases presumably by reaction between the leachable zinc phase and the iron phase. The products of heating at 800° C., or higher, tended to be lumps rather than powders. The lumps were clearly the product of melting as significant effort was required to break them. It may be that these lumps are composed of a zinc bearing spinel akin to franklinite $ZnFe_2O_4$ but more probably with a mixture of ferrous iron and zinc present in the divalent site $(Fe,Zn)Fe_2O_4$. This phase is known to form during the roasting step of the roast-leach-electrowin process and is leached in that process using strong sulphuric acid at elevated temperatures.

Example 4

Kinetics

Figure 8:
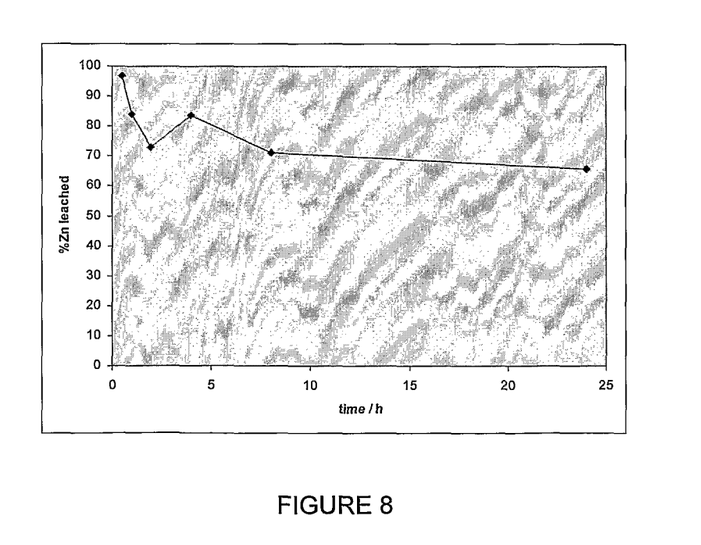
FIG. 8 is a graph showing the zinc recoveries in the samples of Example 4 over an extended period of time.

Samples of ore that had been heated to 500° C. were leached in separate experiments at 1% slurry density for up to 24 h. FIG. 8 shows that the dissolution is extremely rapid with essentially all zinc dissolving within 30 minutes. Increasing the leaching time resulted in a slowly decreasing recovery, this indicates that although the zinc dissolves rapidly there is a subsequent precipitation from the solution.

Figure 9:
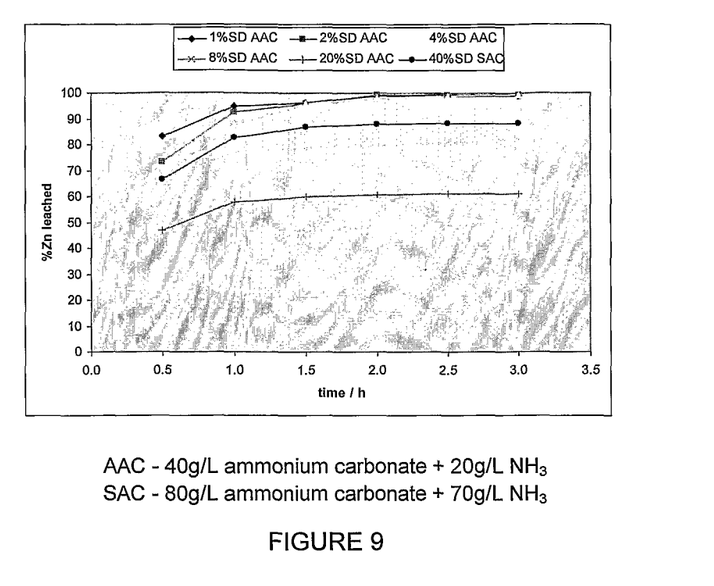
FIG. 9 is a graph showing the zinc recoveries of the higher slurry density samples of Example 4.

Further runs at higher slurry densities were made but the solutions were swapped every 30 minutes to maximise recovery. FIG. 9 shows that high recoveries were achieved for up to 8 wt %/vol but decreased at 20 wt %/vol. Previous experience has shown that AAC can only dissolve a limited concentration of zinc. To overcome this, a solution containing a higher concentration of free ammonia (SAC) was used. The data shows that at a commercially viable slurry density of 40 wt %/vol over 80% of the zinc can be solubilised inside 1 h of total leaching time.

The claim defining the invention is as follows:
1. A method for leaching zinc from a zinc-bearing carbonate mineral, the method comprising the steps of:
   subjecting a material consisting essentially of a zinc-bearing ore containing the zinc-bearing carbonate mineral to elevated temperatures of between about 300° C. and about 900° C. in the absence of additional reactive reagents, thereby producing a decomposed material and carbon dioxide;
   subjecting the decomposed material to an aqueous acid or alkali leach thereby producing an aqueous zinc solution; and
   subjecting the aqueous zinc solution to a zinc recovery step.

2. A method according to claim 1 wherein the zinc-bearing carbonate mineral may form part of a mixture with other ores, including other zinc bearing ores, wherein the zinc-bearing carbonate mineral forms at least 0.5% by weight of the mixture.

3. A method according to claim 1 wherein the zinc bearing carbonate mineral may form part of a mixture with other minerals, including other zinc bearing minerals, wherein the zinc-bearing carbonate mineral forms at least 5% by weight of the mixture.

4. A method according to claim 1 wherein the zinc-bearing carbonate mineral may form part of a mixture with other ores, including other zinc bearing ores, wherein the zinc-bearing carbonate mineral forms at least 50% by weight of the mixture.

5. A method according to claim 1 wherein the zinc-bearing carbonate mineral may form part of a mixture with other minerals, including other zinc bearing minerals, wherein the zinc-bearing carbonate mineral forms at least 75% by weight of the mixture.

6. A method according to-claim 1 wherein the zinc-bearing carbonate mineral may form part of a mixture with other minerals, including other zinc bearing minerals, wherein the zinc-bearing carbonate mineral forms at least 90% by weight of the mixture.

7. A method according to claim 1 wherein the step of subjecting the zinc-bearing carbonate mineral to elevated temperatures of between about 300° C. and about 900° C. thereby producing a decomposed material further comprises:
   subjecting the zinc-bearing carbonate mineral to elevated temperatures of between about 300° C. and about 900° C. thereby producing a decomposed material enriched in zinc oxide relative to the zinc-bearing carbonate ore.

8. A method according to claim 1 wherein the step of subjecting the zinc-bearing carbonate mineral to elevated temperatures of between about 300° C. and about 900° C. thereby producing a decomposed material further comprises:
   subjecting the zinc-bearing carbonate mineral to elevated temperatures of between about 300° C. and about 900° C. thereby producing a decomposed material enriched in zinc oxide and depleted in carbonate relative to the zinc-bearing carbonate ore.

9. A method according to claim 1 wherein the zinc-bearing carbonate mineral is selected from the group consisting of: smithsonite ($ZnCO_3$), zincian siderite ($(Fe,Zn)(CO_3)$), minrecordite ($CaZn(CO_3)_2$), and solid solution intermixtures thereof.

10. A method according to claim 9 wherein the zinc-bearing carbonate mineral is siderite.

11. A method according to-claim 9 wherein the zinc-bearing carbonate mineral is zincian siderite $(Fe,Zn)CO_3$ where Fe>Zn.

12. A method according to claim 1 wherein the elevated temperature is between about 400° C. and about 800° C.

13. A method according to claim 1 wherein the elevated temperature is between about 500° C. and about 700° C.

14. A method according to claim 1 wherein the step of subjecting the zinc-bearing carbonate mineral to elevated temperatures of between about 300° C. and about 900° C.

thereby producing a decomposed material further comprises the step of: subjecting the zinc-bearing carbonate mineral to elevated temperatures of between about 300° C. and about 900° C. for a period of between about 5 minutes and about four hours thereby producing the decomposed material.

15. A method according to claim 1 wherein the step of subjecting the decomposed material to an aqueous acid or alkali leach thereby producing an aqueous zinc solution further comprises subjecting the decomposed material to an ammoniacal leach and, after the step of subjecting the decomposed material to an ammoniacal leach and before the step of subjecting the aqueous zinc solution to a zinc recovery step, the method comprises the steps of:

contacting the aqueous ammoniacal zinc solution containing impurities with an organic phase comprising an ammonium salt of an organic acid extractant dissolved in a hydrophobic diluent, allowing transfer of the zinc to the organic phase and transfer of ammonium to the aqueous phase, thereby providing a zinc-enriched, ammonium-depleted organic phase and an ammonium-enriched, zinc-depleted aqueous phase containing impurities;

separating the zinc-enriched, ammonium-depleted organic phase from the ammonium-enriched, zinc-depleted aqueous phase containing impurities; and contacting the zinc-enriched, ammonium-depleted organic phase with an aqueous solution of ammonia, allowing transfer of the zinc from the organic phase and transfer of ammonium from the aqueous phase, thereby providing an aqueous ammoniacal zinc solution and an organic phase containing an ammonium salt of the organic extractant.

* * * * *